(12) United States Patent
Jain et al.

(10) Patent No.: US 7,089,265 B1
(45) Date of Patent: Aug. 8, 2006

(54) DATABASE MANAGEMENT SYSTEM FOR IMPLEMENTING INDEPENDENT DATABASE ACTIONS IN RESPONSE TO EVENTS OF INTEREST

(75) Inventors: Namit Jain, Foster City, CA (US); Rajit Kambo, Sunnyvale, CA (US); Shailendra Mishra, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 608 days.

(21) Appl. No.: 10/124,908

(22) Filed: Apr. 17, 2002

(51) Int. Cl.
*G06F 17/30* (2006.01)
(52) U.S. Cl. .................................. 707/104.1; 707/102
(58) Field of Classification Search ................ 707/200, 707/102, 104.1
See application file for complete search history.

(56) References Cited

U.S. PATENT DOCUMENTS

| | | | |
|---|---|---|---|
| 5,471,629 A * | 11/1995 | Risch .......................... | 707/201 |
| 6,192,365 B1 * | 2/2001 | Draper et al. ................ | 707/101 |
| 6,754,658 B1 * | 6/2004 | Matsuno ........................ | 707/9 |
| 2002/0133507 A1 * | 9/2002 | Holenstein et al. .......... | 707/200 |
| 2003/0145021 A1 * | 7/2003 | Parkkinen .................... | 707/204 |

* cited by examiner

*Primary Examiner*—Leslie Wong
(74) *Attorney, Agent, or Firm*—Hickman Palermo Truong & Becker, LLP (57) ABSTRACT

A method and apparatus for managing a database is provided. A database management system conducts a plurality of database transactions with a plurality of clients. An event may be detected as a result of one of the transactions. The event is mapped to an independent database action. In response to detecting the event, the independent database action is executed without interference from the transaction that caused the event.

20 Claims, 4 Drawing Sheets

DATABASE MANAGEMENT SYSTEM FOR IMPLEMENTING INDEPENDENT DATABASE ACTIONS IN RESPONSE TO EVENTS OF INTEREST

FIELD OF THE INVENTION

The present invention relates to database management systems. In particular, the present invention relates to a database management system that executes independent database actions in response to events of interest.

BACKGROUND OF THE INVENTION

Database management systems manage access between clients and databases. With increasing database usage, database management systems are required to handle a larger number of transactions between clients and databases. The interactions between clients and databases are also becoming more complex. Database transactions often involve multiple clients. Furthermore, the type of actions that are typically performed in one transaction increasingly requires additional user-involvement.

Frequently, clients want the database management system to perform some action automatically in response to an event of interest. Consequently, various approaches have been developed to allow database management systems to perform actions in response to events of interest. One such approach involves the use of triggers, alternatively referred to as "synchronous actions". Specifically, users can define triggers that (1) specify an operation, and (2) specify an event. The trigger is then stored in a database system. When the specified event occurs, the trigger is "fired" and the database system performs the specified operation. Unfortunately, the specified operation is performed synchronously relative to the process that caused the event that fired the trigger. Consequently, the performance of the operation that caused the trigger to fire suffers.

Another approach to allow database management systems to perform actions in response to events of interest involves notifications. Such actions are performed asynchronously relative to the database transactions that cause the events of interest to occur. For example, in response to an event of interest caused by a transaction, the database management system signals a notification out to a designated user or client. The sending of the message occurs independent of the transaction that caused the event of interest. The designated user or client may respond to the notification by performing some action indicated by the notification. For example, the user may complete a transaction with the database management system.

Based on the foregoing, it is clearly desirable to provide a mechanism and techniques, for allowing database management systems to perform actions in response to events of interest, that avoid the disadvantages of existing approaches.

SUMMARY OF THE INVENTION

Techniques are provided for performing actions, within a database management system, in response to an event, where the actions are performed independently relative to the operation that caused the event.

According to one aspect of the invention, an event is detected in a transaction between a client and a database. The database management system responds to the event by initiating an independent database action.

Because independent database actions are performed by the database management system automatically in response to the occurrence of their corresponding event of interest, it is not necessary for a notification to be sent to any client. Consequently, the round-trip communication associated with the notification approach is avoided. Further, because the independent database action is performed without interference to the triggering transaction, the triggering transaction does not suffer the performance penalty associated with the trigger approach. Other advantages provided by embodiments of the invention will be made clear herein.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

A method and apparatus for implementing independent database actions within a database management system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

DEFINITIONS

A "transaction" is a set of instructions executed by servers of a database management system to affect data objects stored by the database management system. Transactions are initiated by requests, typically from users operating clients. The set of instructions in a transaction are executed as an atomic unit. Therefore, initiating execution of a transaction causes either all instructions in the instruction set of the transaction to be executed, or all of the instructions in the instruction set to be aborted or not executed. If the transaction cannot be completed, executed instructions in that transaction's instruction set are rolled-back, or undone.

An "event" is an occurrence of a transaction containing an item that has some predetermined value, characteristic, or aspect. An "event of interest" is an event that the database server has been configured to detect, and to perform some action when detected.

The transaction that causes the event of interest to occur is referred to herein as the "triggering transaction". Actions performed by a database management system (1) in response to a designated event, and (2) independently relative to the database transaction that triggered the designated event, are referred to herein as "independent database actions". An independent database action is (1) asynchronous relative to the triggering transaction, and (2) not executed as part of the triggering transaction. Because the independent database action does not have to be synchronized with the operations performed in the triggering transaction, and it is not part of the triggering transaction, it can, for example, be performed when sufficient resources become available. This may be done even if sufficient resources become available after the triggering transaction has completed. Therefore, the timing of when the independent database action is to be performed is not dictated by the timing of when operations in the triggering event are executed.

For the purpose of explanation, the client that issues the transaction that causes the event of interest to occur is referred to herein as the "triggering client". The client that defines an independent database action for an event may be different than the client that initiates the triggering transaction. The client that defines the independent database action is referred to as the "action-defining client".

Overview

Embodiments of the invention enable a database management system that processes transactions from different clients to perform independent database actions in response to detecting events caused by the database transactions.

The independent database actions allow clients to automate interactions with a database system according to a specified set of instructions. The instructions are executed upon the database management system detecting an event in a triggering transaction. The triggering transaction is processed by the database system independently of the independent database action's execution.

As an example, instructions provided by one client may be performed in response to specific events contained in subsequent triggering transactions. As a result, one client may involve other clients when conducting a transaction with a database system, but the involvement by other clients may be automated according to instructions specified by those other clients.

Among other advantages, executing independent database actions in response to triggering events avoids the use of notification and notification responses. Resources used to notify other clients, and to receive responses to those notifications, are conserved. Examples of these resources include network bandwidth and queue allocation.

Furthermore, a database management system under an embodiment of the invention can perform actions on a database using previously specified instructions. These actions may be performed independently of other transactions that may be processed concurrently. This reduces delays and performance problems that result when the database management system is forced to execute instruction sets concurrently with their triggering transactions.

In contrast, database management systems that offer only synchronous triggers require the instructions associated with the triggers to be executed in response to certain communications of an ongoing transaction. Therefore, the database management system cannot manage its internal resources to plan for the occurrence of the synchronous actions. When synchronous actions do occur, the database management system may not have sufficient resources available to efficiently execute the corresponding action while processing other current transactions and processes. As a result, the occurrence of synchronous triggers may slow processing of other transactions in progress, including the triggering transaction.

Another advantage provided is that clients may specify independent database actions to be performed on their behalf in response to triggering transactions conducted by other clients. In this way, one client may configure the database management system to perform a certain action on the database if another client accesses the database in a particular manner. Furthermore, the independent transaction is performed independently of the triggering transaction. In contrast, other systems currently in use do not allow clients to automate independent database actions that are triggered by a transaction initiated by another client. Rather, database transactions are automated to occur with the triggering transaction, so that the action is conducted synchronously with the transaction that caused the action to be triggered.

If other clients are to be involved in an operation, prior systems use the notification approach. However, use of the notification approach may be problematic if the other client is not on-line.

As an example, one client (Client X) may configure the database management system to enter an approval into the database if a certain event of interest occurs. The event of interest may correspond to an occurrence of an item contained in a transaction of another client (Client Y). For example, assume that event corresponds to an item in the transaction of Client Y having some value that meets a minimum criteria. According to an embodiment of the invention, Client X selects to automate his approval of the item contained in Client Y's transaction if that item meets the meets the minimum value.

In contrast, under prior art systems, Client X must use the notification approach, Client X must configure the database management system so that the database management system will send a notification message to Client X if a certain event of interest occurs. The event of interest may be contained in a transaction performed by Client Y. Client X would then have to review the notification message and manually approve the item in Client Y's transaction. Once Client X responds to the message, Client X's approval is entered into the database. The notification message to Client X would use resources, including network bandwidth to notify Client X. Client X may be off-line, in which case the database management system must check for Client X to become on-line. Moreover, Client X has no mechanism to automate his approval of the item in Client Y's transaction. The result is that the approval needed from Client X is delayed, especially if Client X is off-line, even though the condition for receiving the approval is met.

In one application of an embodiment, a user of the client may program an action that is to be executed when an event is detected. The detection of the event may be set to occur when a second user conducts a transaction with the database management system. The independent database action may be performed for the first user, even though the triggering transaction is between a second user and the database management system. For example, the first user and the second user may each have an account. The independent database action may affect the account of the first user, based on an event that is detected in the transaction affecting the account of the second user.

System Description

Figure 1:
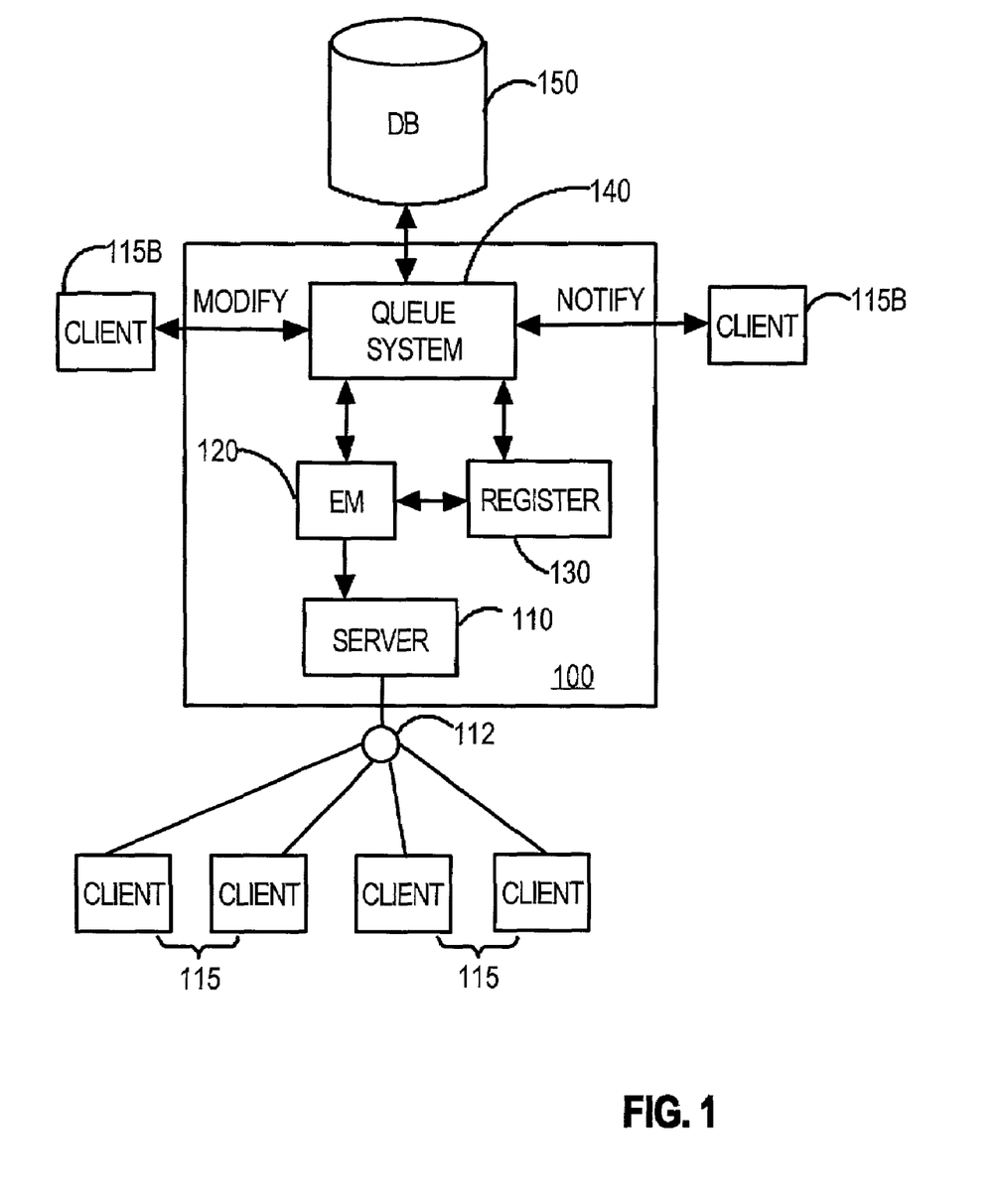
FIG. 1 is a block diagram of a database management system for performing an independent database action in response to a designated event.

FIG. 1 is a block diagram of a database management system for performing an independent database action in response to a designated event. A database management system 100 includes a server component 110, an event monitor 120, a register 130 and a queue 140. A plurality of clients 115 communicate with an interface 112 of the database management system 100. The database management system 100 communicates with a database 150 to process database transactions and other client communications.

The clients 115 may, for example, correspond to terminals executing a database application. Users may operate clients 115 to signal transaction requests to database management system 100 via interface 112. The server 110 processes the transaction requests for database management system 100.

In one application, interface 112 processes communications from a wide area network such as the Internet. Other components may be used instead of interface 112. For example, load balancers may be used to process web-based requests from clients, and to select one database management system from a cluster of database management systems.

Events of Interest

Using the techniques described herein, users or managers of the database management system 100 may associate independent database actions with certain events. The events of interest are the events that are associated with some action that has to be performed by the database system 100. When an event of interest occurs, the server component 110 performs the independent database action that has been defined for that event of interest.

For example, an event of interest may be defined to occur if any future transaction makes a selection from certain data objects in database 150. The event of interest may be detected when a transaction actually selects those data objects from database 150. In another example, an event of interest may be defined to occur if a transaction conducted with the database system is from a certain source (client terminal or user), so as to have a particular source identification. The event of interest may be detected if a subsequent transaction actually contains that specified source identification.

As another example, an event of interest may be defined as a specified user or client terminal being affected by a given transaction from anyone of the clients that can conduct transactions with the database system 100. If a subsequent transaction is detected as affecting the designated client or terminal in the manner specified, then the event of interest is detected as occurring.

In another example, an event of interest may be designated to occur when server component 110 processes a transaction that affects a data structure of the database system in a particular manner. For example, data entered into the data structure by a particular user may be removed as a result of a transaction. The removal of the data may be the occurrence of the event.

Events of interests may also occur because a transaction is conducted with the database management system that has a particular feature or property. For example, a first user may program an event of interest to be the occurrence of a second user conducting a transaction with the database management system. The execution of transactions containing particular metadata information may similarly be designated to be events of interests. Specific examples where metadata information about a transaction may correspond to an event of interest include situations in which the metadata specifies a particular transaction time or a particular job size.

An attempt to use more than a certain threshold of resources may also be an event of interest. If a user, for example, makes a large data entry requiring too many database resources, then the creation of that entry may be detected as an event of interest, so that the database management system automatically performs an action to prevent problems that may result from the large entry.

The various components that participate in the detection of events of interest, and the execution of the corresponding independent database actions, shall now be described in greater detail.

The Event Monitor

The event monitor 120 monitors communications processed by server component 110 to detect when events of interest occur. The events of interest may occur as a result of transactions performed by database management system 100 by clients 115. The event monitor 120 may include a memory to identify when events of interest occur while server component 110 processes transactions with a particular client.

The Register

Register 130 maps events of interests to actions that are to be performed by database management system 100 when those events of interest occur. An action that is mapped to an event of interest is referred to herein as a "triggered action". In an embodiment, at least three types of triggered actions are possible in response to event monitor detecting an event of interest: (a) synchronous actions (b) notifications and (c) independent database actions. The register 130 may cause a job corresponding to one of the actions to be entered into queue 140, where it will be executed by server 110 at a particular time as an automatic response to the identified event of interest being detected. Other components in system 100 that may execute or partially perform the triggered action may include, for example, a messaging application that sends a notification to a predetermined recipient.

The Queue

In an embodiment, queue 140 is a software driven system that lists jobs that need to be processed by database system 100 for accessing database 150. Each job may correspond to one or more instructions of a transaction, independent database action, synchronous action, notification or other operation that is to be performed by server component 110 and/or other components of database system 100. The queue 140 may structure jobs for subsequent execution by the database system 100 according to some order, such as a first-in, first-out execution order.

Queue 140 prioritizes execution of transactions, independent database action, synchronous actions, and notifications by server component 110, or other components of database system 100. If event monitor 120 does not detect an event of interest in one of the transactions being executed, the transaction is received and processed by server 110 according to a priority established by queue 140. For example, queue 140 may access database 150 for a transaction that seeks to read data objects without affecting other clients 115.

In an embodiment, queue 140 structures jobs so that mechanisms server 110 for performing transactions and actions are proportioned to perform different processes while executing transactions. Specifically, queue 140 may structure the jobs so that some of the resources of server 110 are used to perform processes for executing synchronous actions, notifications, and independent database actions in response to event monitor 120 identifying events in some or all of the transactions. Other resources of server 110 are used to execute transactions between multiple clients and the database system.

Independent Database Actions

Independent database actions cause one or more programmatically controlled operations to be performed on selected data objects of database 150. In one embodiment, register 130 matches an event of interest to a set of instructions that are then executed by server 110. The execution of instructions may correspond to operations performed on database 150. The instruction set may be specified by the triggering client, or by another client. Likewise, the performance of the independent database action may affect the triggering client, or another client.

Several advantages are provided by a database management system that includes independent database actions. One advantage is that actions that would otherwise be performed as a result of notifications to other clients are performed automatically, without notifications. By using independent database actions, database management system 100 can avoid having to send notifications and receiving notification responses. As a result, database management system 100 does not have to wait for a notified client to respond to the notification before completing the triggered action. Among other advantages, this saves database system resources, limits use of networking bandwidth, and avoids situations where actions must be postponed until a response to a notification is received.

Independent database actions also allow the database management system to distribute internal resources so as to avoid having to complete the triggered action when internal resources are limited. For example, if transaction activity is heavy, the database management system 150 may provide for a triggered independent database action to be performed at a later time, in order to free up resources to overcome the heavy transaction activity.

Synchronous Actions

Synchronous actions are performed as part of the triggering transaction. As a result, the synchronous actions force server 110 to access database 150 for purpose of performing the synchronous action while the corresponding triggering transaction is being conducted.

In general, a synchronous action is triggered when a transaction from one client causes event monitor 120 to detect an event previously associated with that synchronous action. The register 130 may match a detected event to a synchronous action. The synchronous action may require server 110 to access database 150 to modify or retrieve data objects while the triggering transaction is being conducted.

Furthermore, the triggering transaction may also dictate the specific manner in which the synchronous action is performed. Therefore, if the transaction requires several communications between server 110 and database 150, each communication may be accompanied by a corresponding act performed by server 110 on the database 150 as part of the identified synchronous action.

As an example, if a transaction triggers an event by modifying a first set of data object in database 150, a corresponding synchronous action may require a similar modification to a second set of data objects. The second set of data objects are modified as part of the same transaction that modifies the first set of data objects. As a result, a transaction request from application 115 to modify the first set of data objects results in the second set of data objects being modified concurrently, and possibly simultaneously.

Notifications

Notifications cause server 110 or other components of database management system 100 to notify pre-designated clients 115b or users of an event of interest. The notified user or client 115b is typically different than the client/user who conducts the transaction that causes the event of interest to occur.

A notification requires one or more notified clients 115b to interact with the database 150. According to an embodiment, the notified clients 115b may conduct a separate transaction with the database 150 in response to being notified. The notification may be sent in response to the event of interest being detected on the triggering transaction. In some configurations, a triggering transaction may be precluded from completion until a transaction specified by the notification is completed.

It is possible for the client being notified to be off-line when the event of interest occurs. In such instances, the database system 100 messages the notified client 115b. When the notified client 115b comes on-line, the notified client can be prompted to interact with database 150 in order to complete the transaction.

Operation of Independent Events

Figure 2:
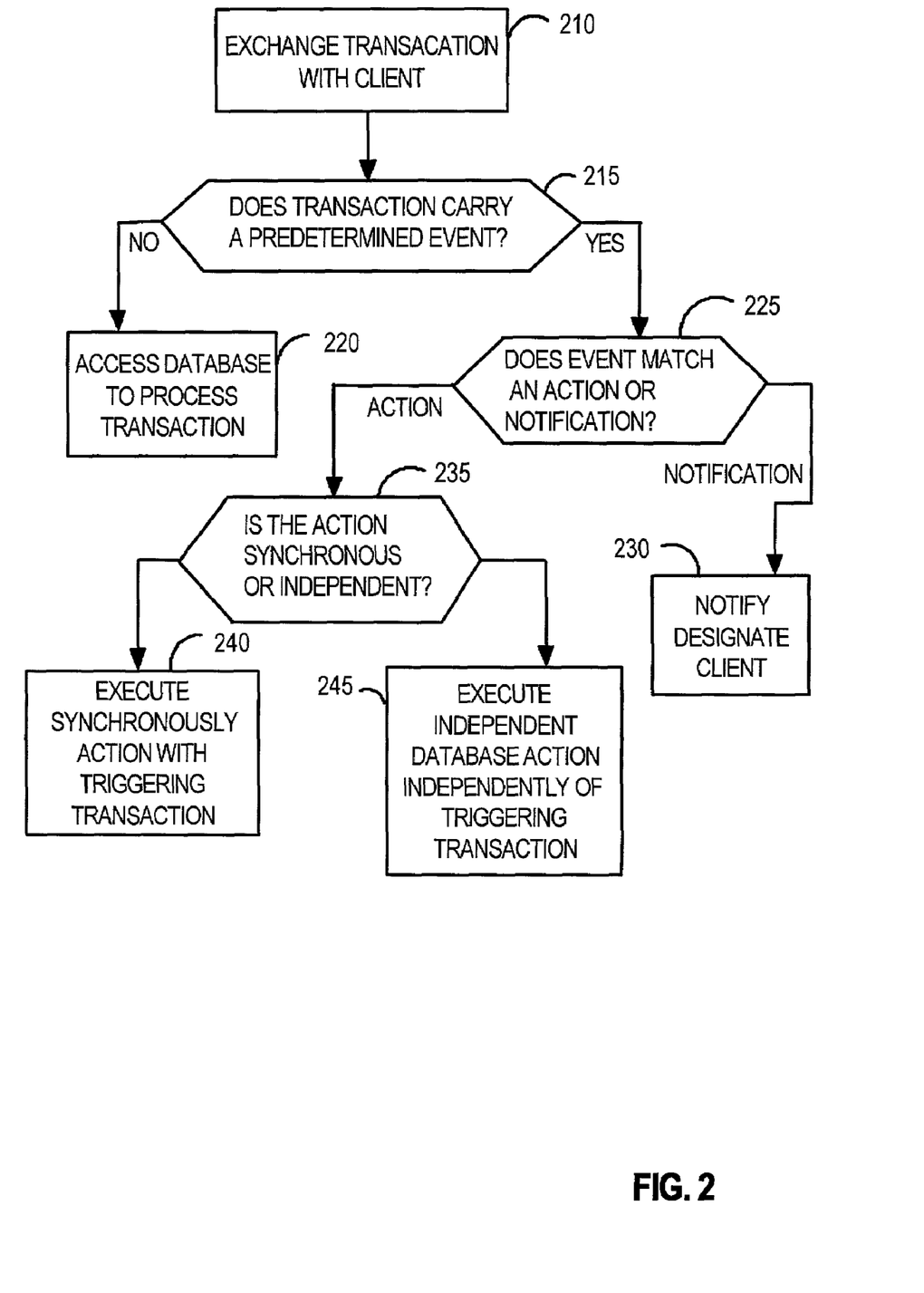
FIG. 2 illustrates a method for managing a database utilizing independent database actions, under an embodiment of the invention.

FIG. 2 is a flowchart that illustrates a method for managing a database utilizing independent database actions. A method such as described with FIG. 2 may be performed in a database management system such as described with FIG. 1. Reference to numerals in FIG. 1 is intended to illustrate exemplary components for performing the method.

In step 210, database management system 100 performs a transaction in response to a request from one of the clients 115. The database management system 100 may perform numerous transactions with many other clients simultaneously. The transaction involves communications signaled and received by both the client 115 and the database management system 100.

In step 215, a determination is made as to whether the transaction is a triggering transaction by determining whether the transaction specifies operations, which when executed, cause an event of interest to occur. For example, with reference to FIG. 2, an event monitor 120 monitors transactions processed by database management system 100 to detect events of interest.

If the determination of step 215 is that the particular transaction is not a triggering transaction, step 220 provides that the database 150 is accessed to process the transaction without any other actions being performed as a result of that transaction.

If the determination is step 215 is that the transaction is a triggering transaction, then step 225 makes a determination as to whether an action or notification is to be performed. The action involves accessing the database being managed and performing some function associated with the event of interest without sending a notification. The notification involves sending notifications to one or more clients or users according to a previous designation. The notified client may then elect to perform some action in response to the notification. The notification may specify the manner in which the notified client should respond to the notification.

If in step 225 the event is matched to a notification, the step 230 provides that the appropriate clients are identified. For example, register 130 may match a detected event with identifications of previously identified clients 115*b*, or of previously identified users operating clients 115*b*.

If in step 225 the event is matched to an action, step 235 makes a determination as to whether the action is synchronous, or an independent database action. If the determination is that the action is synchronous, then step 240 provides that the synchronous action is executed concurrently with or immediately, as part of the triggering transaction, in response to detecting the event of interest.

If the determination in step 235 is that the action is an independent database action, then step 245 provides that the independent database action is executed independently of the triggering transaction. For example, queue 140 may manage instructions for executing the independent database action so as to load the instructions into the server 110 upon a determination that sufficient database resources are available. As another example, the instructions may be executed at a designated time after the triggering transaction, regardless of whether the triggering transaction is in process or completed.

Figure 3:
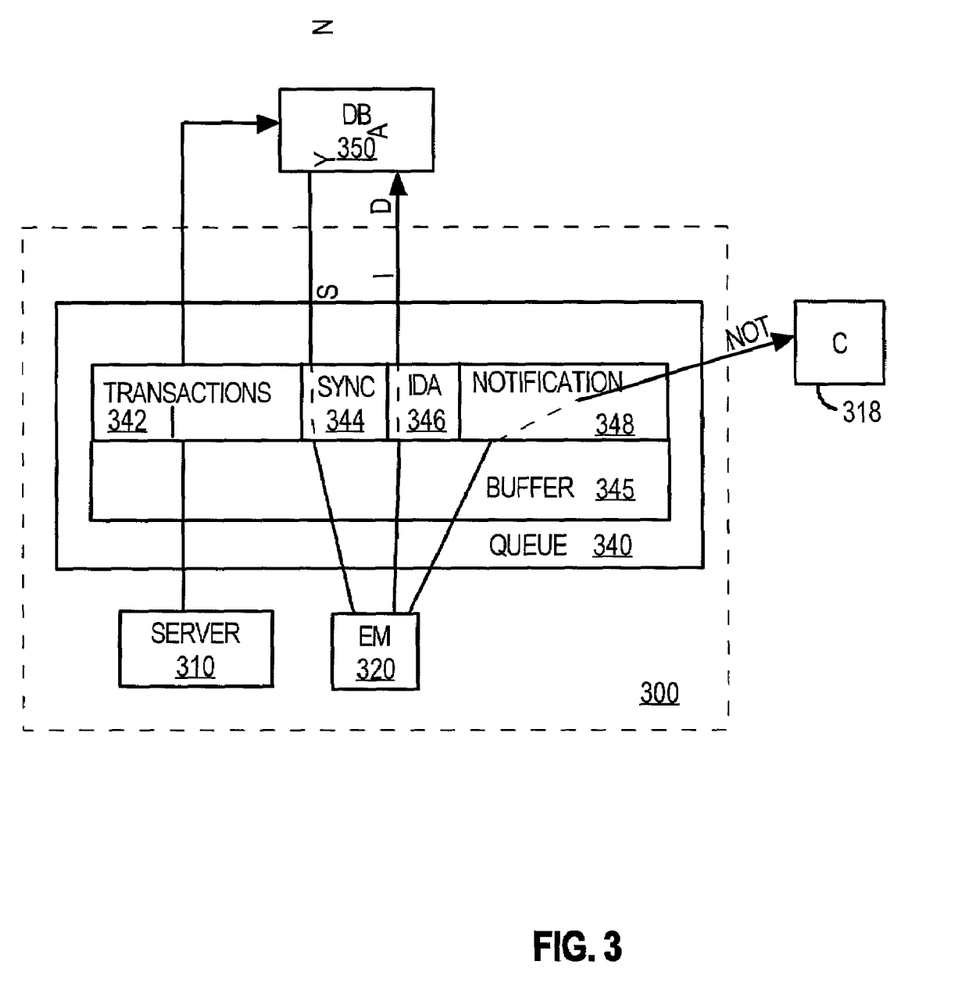
FIG. 3 is a block diagram illustrating partitioning of resources within a database management system, under an embodiment of the invention.

FIG. 3 is a block diagram illustrating a portioning of resources within a database server 300. In FIG. 3, a queue 340 orders multiple transactions and/or actions for subsequent execution by corresponding execution mechanisms of database server 300. In an embodiment, queue 340 may structure jobs that specify instructions stored within the database server 300. The instructions may correspond to operations for performing transactions, synchronous actions, or independent database actions.

The database transactions are provided by a server component 310, which receives and dispatches communications from clients. According to an embodiment, execution mechanisms of database server 300 are distributed to perform processes for synchronous actions, notifications, and independent database actions. These execution mechanisms may include, for example, processing resources, memory and cache. Some of the execution mechanisms of database server 300 include transaction mechanisms 342 for processing database transactions. Other mechanisms of database server 300 include (i) synchronous action mechanisms 344 for processing actions synchronously in response to event monitor 320 detecting events of interest; (ii) independent database action mechanisms 346 to perform actions on the database 350 independent of the triggering transaction or event of interest; and (iii) notification mechanisms 348 for notifying previously designated recipients of an event of interest.

As mentioned, some of the database transactions may be triggering transactions that cause events of interest to occur. An event monitor 320 may couple to a register 330 to match events of interest with actions or notifications. The register 330 may signal queue 340 to structure or order a job corresponding to, synchronous action, independent database actions, or notification. The register 330 may also cause the notification mechanism 348 of the database server 300 to send notifications corresponding to the detected events. If an event of interest is detected, the corresponding instructions are signaled to one of either the synchronous action mechanisms 344, independent database action mechanisms 346, or notification mechanisms 348, based on the action identified by register 330.

The synchronous action mechanisms 344 may identify corresponding instructions in order for synchronous actions (SYNC) to be executed on database 350. The instructions for a synchronous action are executed on database 350 at the same time as the process for executing the triggering transaction. For example, a user may configure synchronous actions to be performed immediately whenever that user accesses database 350. The user may then access the database 350 to operate on certain data objects. The synchronous action may correspond to operations that are performed on data objects of the database 350 concurrently while the database system 300 is conducting the triggering transaction with that user.

If the event of interest is associated with an independent database action, the independent database action mechanisms 346 identify instructions for executing independent database actions (IDA) on database 350. The instructions accessed by independent database mechanisms 346 are executed on database 350 independently of the processes performed by transaction mechanisms 342 that execute the corresponding transaction. As an example, a user may configure database system 300 to execute instructions upon or after another user or client performs a specified operation on database 350. When that specified operation is detected as being performed by the other user or client, the instructions for performing the independent database action are identified by the independent database action mechanisms 346 and executed on database 350. These instructions are executed independently of the triggering transaction, so they may be executed after a determination is made that the queue 340 is available to execute the independent database action.

Both synchronous actions and independent database actions may be performed to modify, create, delete, update or perform other operations on selected data objects in database 350.

If the event of interest is associated with a notification, the notification mechanisms 348 identifies instructions for sending notifications (NOT) to clients identified by that notification. The instructions for the notification mechanisms 348 may also specify how queue 340 is to perform responses from notified clients 318.

In an embodiment, queue 340 is configured to efficiently manage the synchronous action mechanisms 344, the independent database action mechanisms 346, and the notification mechanisms 348, so as to prevent congestion or other problems that would affect performance of the database system 300. One advantage provided by processes performed by independent database action mechanisms 346 is that the database system 300 can be configured to perform the independent database action at any time. In contrast, processes for performing synchronous actions are executed immediately upon detecting the triggering event. Notification mechanisms 348 handle responses from notified client, which are not within the queue's control. But queue 340 can manage independent database action mechanisms 346 so that such actions are executed when sufficient resources are available to database server 300. The overall resource availability of database server 300 may be determined from some predetermined factor, such as the size of all the jobs awaiting to be processed.

According to an embodiment, at least 50% of the overall resources in database server 300 is dedicated for the transaction mechanisms 342. Thus, the predetermined factor for determining availability of the database server 300 would be whether 50% of the memory and processing resources of the database system are dedicated for processing transactions. The remaining portion of the overall resources can be divided amongst synchronous action mechanisms 344, independent database action mechanisms 346, and notification mechanisms 348. Transaction execution mechanisms 342 borrow resources from independent database action mechanisms 346 in order to maintain sufficient resources to process all transactions during heavy use. Thus, independent database actions may be executed less often in times of heavy use. This allows for the database system 300 to be more flexible in handling all the transactions and required operations. The queue 340 may structure jobs to facilitate borrowing of resources amongst the different mechanisms.

The transactions, actions and notifications that are required to be processed by queue 340 may be managed to insure proper sequence and timing of executions. In an embodiment, a buffer 345 is integrated or otherwise accessible to database server 300 for the purpose of ordering and timing the transactions, actions and notifications. The buffer 345 may store a set of instructions in order to time their execution to be concurrent with communications of a corresponding transaction.

The independent database action mechanisms 346 have particular use for buffer 345. In one embodiment, buffer 345 stores independent database actions using a first-in, first-out (FIFO) protocol for the detected events and/or instructions sets. Independent database action may, for example, comprise of several sets of instructions, involving more than one client. The buffer 345 orders the sets of instructions so that the instruction set for each client is executed in the appropriate order. For example, an outcome from a set of instructions for an independent database action of one client may require a result of another independent database action or notification response provided by another client.

The buffer 345 may perform similar functions for notifications being processed by notification mechanisms 348. For example, the FIFO configuration of buffer 345 may cause responses from notified clients to be processed according to an order required by the triggering transaction.

To provide a more specific example, data objects in database 350 may be modified pending approval by two supervisors, designated as Supervisor A and B. Supervisor A can approve of a proposed modification only if Supervisor B first approves the proposed modification. Supervisor A may configure an independent database action to occur and perform the approval (or rejection) if Supervisor A wishes to completely automate the approval pending satisfaction of some conditions. Supervisor A may, for example, set an independent database action to approve the modification automatically if (i) Supervisor B approves the proposed modification, and (ii) if the proposed modification satisfies some criteria specified by Supervisor A. The buffer 345 may store instructions for holding Supervisor A's approval until Supervisor B's approval is received. Then, database system 300 may determine if the criteria specified by Supervisor A is met by the proposed modification. The instruction set for Supervisor A's approval may be maintained in buffer 345 until both of these conditions are met.

Hardware Description

Figure 4:
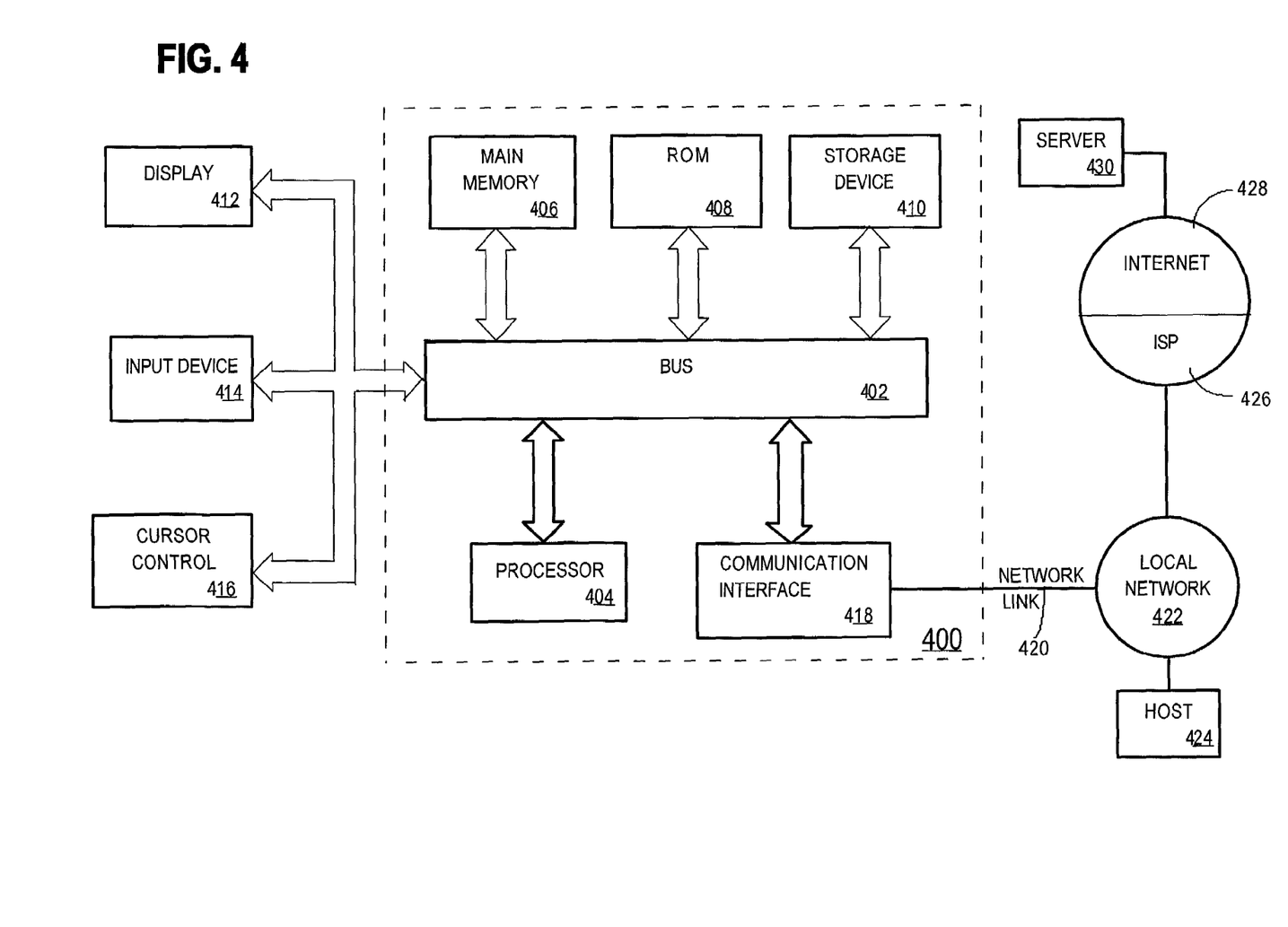
FIG. 4 is a block diagram that illustrates a computer system upon which an embodiment of the invention may be implemented.

FIG. 4 is a block diagram that illustrates a computer system 400 upon which an embodiment of the invention may be performed. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for performing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to perform the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be performed. In any such performance, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising performing a computer executed operation involving instructions, wherein the computer executed operation is at least one of:
    A) sending said instructions over transmission media;
    B) receiving said instructions over transmission media;
    C) storing said instructions onto the computer readable storage medium; and
    D) executing the instructions;
    wherein said instructions are instructions which, when executed by one or more processors, cause the one or more processors to perform the steps of:
        in response to user input, storing data that associates a database operation with an event, the database operation altering data objects stored in a database of the database system;
        detecting when the event is caused by a triggering transaction conducted within the database system;
        inspecting the data to determine that the database operation has been associated with the event; and
        automatically performing the database operation independent of the triggering transaction, wherein automatically performing the database operation independent of the triggering transaction includes performing the database operation without notifying any user prior to executing the database operation.

2. The method of claim 1, wherein automatically performing the database operation independent of the triggering transaction includes performing the database operation without sending a notification.

3. The method of claim 1, wherein inspecting the data to determine that the database operation has been associated with the event includes selecting a specified database operation from a group of database operations.

4. The method of claim 1, wherein the instructions include instructions for delaying performance of the database operation until the database system has available resources for performing the database operation based on a predetermined criteria, and automatically performing the database operation in response to detecting that the database system has the available resources.

5. The method of claim 1, wherein automatically performing the database operation independent of the triggering transaction includes executing the database operation on behalf of a first user that is different than a second user that initiates the triggering transaction, wherein the database operation is specified by the second user.

6. The method of claim 1, wherein automatically performing the database operation independent of the triggering transaction includes executing the database operation on behalf of a first user that is different than a second user that initiates the triggering transaction, wherein the database operation is specified by the first user.

7. The method of claim 1, wherein automatically performing the database operation independent of the triggering transaction includes selecting the database operation in response to detecting when the event is caused by a triggering transaction.

8. The method of claim 1, wherein inspecting the data to determine that the database operation has been associated with the event includes determining an effect of the triggering transaction on data objects of the database system.

9. The method of claim 1, wherein automatically performing the database operation independent of the triggering transaction includes performing the database operation on behalf of a user that is not concurrently operating a terminal that is in communication with the database system while the triggering transaction is being conducted with the database management system.

10. A method comprising performing a computer executed operation involving instructions, wherein the computer executed operation is at least one of:
    A) sending said instructions over transmission media;
    B) receiving said instructions over transmission media;
    C) storing said instructions onto the computer readable storage medium; and D) executing the instructions;
wherein said instructions are instructions which, when executed by one or more processors, cause the one or more processors to perform the steps of:
mapping an event of interest to a specified database action;
detecting a triggering transaction, amongst a plurality of transactions being conducted with the database system, that causes the event of interest to occur;
in response to detecting that the triggering transaction caused the event of interest to occur, identifying the database action that has been mapped to the event;
and in response to identifying the database action, automatically performing the database action independent of the triggering transaction to alter data objects in the database system without sending a notification to the user that associated the event of interest to the independent database action, wherein automatically performing the database operation independent of the triggering transaction includes performing the database operation without notifying any user prior to executing the database operation.

11. The method of claim 10, wherein identifying an independent database action in response to detecting the triggering transaction includes mapping an event of interest caused by the triggering transaction to a specified independent database action.

12. The method of claim 10, wherein asynchronously executing the independent database action includes executing the independent database action after the first transaction is completed.

13. The method of claim 10, wherein asynchronously executing the independent database action includes delaying execution of the independent database action until a determination is made that sufficient database resources exist to execute the independent database action based on a predetermined criteria.

14. The method of claim 10, wherein asynchronously executing the independent database action includes automatically executing the independent database action on behalf of a user that is not concurrently operating a terminal that is in communication with the database system while the triggering transaction is being conducted with the database management system.

15. A database system for performing a plurality of database transactions, the database system comprising:
an event monitor executing on one or more processors configured to monitor at least some of the plurality of database transactions in order to detect an event caused by a first database transaction in the plurality of database transactions;
a server including one or more processors configured to perform:
a first process configured to execute the plurality of database transactions;
a second process configured to identify an independent database action associated with the event detected by the event monitor, and to automatically execute the independent database action asynchronously after detecting the event, wherein the second process is configured to automatically execute the independent database action without notifying any user prior to executing the independent database action.

16. The database system of claim 15, wherein the server is configured to perform the second process to execute the independent database action independently of the first process executing the first transaction.

17. The database system of claim 15, wherein the server is configured to borrow resources for performing the second process in order to perform the first process upon determining, that resources for performing the first process are insufficient to process the plurality of database transactions according to a predetermined criteria.

18. The database system of claim 15, wherein the event monitor is configured to detect a second event from processing the plurality of database transactions, and wherein the server is configured to perform a third process configured to match the second event to a notification.

19. The database system of claim 18, wherein the event monitor is configured to detect a third event from processing the plurality of database transactions, and wherein the server system is configured to perform a fourth process configured to match the third event to a synchronous action.

20. The database system of claim 19, further comprising a buffer that determines an order of executing the independent database action, the notification and the synchronous action, each job being selected by the event monitor based on the detected event.

* * * * *

UNITED STATES PATENT AND TRADEMARK OFFICE
CERTIFICATE OF CORRECTION

PATENT NO. : 7,089,265 B1
APPLICATION NO. : 10/124908
DATED : August 8, 2006
INVENTOR(S) : Namit Jain et al.

It is certified that error appears in the above-identified patent and that said Letters Patent is hereby corrected as shown below:

Col. 13, line 65, delete "the" and insert therefor: --a--

Col. 14, line 66, delete "the" and insert therefor: --a--

Signed and Sealed this

Fourteenth Day of November, 2006

JON W. DUDAS
*Director of the United States Patent and Trademark Office*